United States Patent
Feugnet et al.

(10) Patent No.: US 7,474,406 B2
(45) Date of Patent: Jan. 6, 2009

(54) STABILIZED SOLID-STATE LASER GYRO AND ANISOTROPIC LASING MEDIUM

(75) Inventors: Gilles Feugnet, Les Ulis (FR);
Jean-Paul Pocholle, La Norville (FR);
Sylvain Schwartz, Paris (FR)

(73) Assignee: Thales (FR)

( * ) Notice: Subject to any disclaimer, the term of this patent is extended or adjusted under 35 U.S.C. 154(b) by 305 days.

(21) Appl. No.: 10/582,629

(22) PCT Filed: Nov. 23, 2004

(86) PCT No.: PCT/EP2004/053062

§ 371 (c)(1),
(2), (4) Date: Jun. 12, 2006

(87) PCT Pub. No.: WO2005/066586

PCT Pub. Date: Jul. 21, 2005

(65) Prior Publication Data

US 2007/0223001 A1    Sep. 27, 2007

(30) Foreign Application Priority Data

Dec. 12, 2003  (FR)  .................................. 03 14598

(51) Int. Cl.
*G01C 19/64* (2006.01)
(52) U.S. Cl. ...................................... 356/459
(58) Field of Classification Search ......... 356/459–476; 372/94
See application file for complete search history.

(56) References Cited

U.S. PATENT DOCUMENTS 3,854,819 A * 12/1974 Andringa ..................... 356/467

(Continued)

FOREIGN PATENT DOCUMENTS

FR    2128617    10/1972

(Continued)

OTHER PUBLICATIONS

A.C. Nilsson, E.K. Gustafson and R.L. Byer, "Eigenpolarization Theory of Monolithic Nonplaner Ring Oscillators", IEEE Journal of Quantum Electornics 25 (4), 767-790, 1989.

(Continued)

*Primary Examiner*—Tarifur Chowdhury
*Assistant Examiner*—Jonathon D. Cook
(74) *Attorney, Agent, or Firm*—Lowe Hauptman Ham & Berner, LLP

(57) ABSTRACT

The field of the invention is that of solid-state laser gyros. One of the major inherent problems in this technology is that the optical emission of this type of laser is by nature highly unstable in terms of power. To reduce this instability, the invention proposes to introduce, into the cavity, optical gains controlled by the installation of an optical assembly comprising an anisotropic lasing medium, a first optical element and a second optical element exhibiting a nonreciprocal effect, each acting on the polarization of the counterpropagating optical modes, at least one of these two effects being variable, thus making it possible to introduce controlled optical gains that depend on the propagation direction of the counterpropagating optical modes. Several devices are described and employ either fixed effects of the element that are combined with variable nonreciprocal effects, or the reverse. These devices apply in particular to monolithic-cavity lasers.

11 Claims, 9 Drawing Sheets

U.S. PATENT DOCUMENTS

| | | | |
|---|---|---|---|
| 3,862,803 A | | 1/1975 | Yntema et al. |
| 3,890,047 A | * | 6/1975 | Warner ........................ 356/467 |
| 4,219,275 A | * | 8/1980 | Henry ........................ 356/472 |
| 4,470,701 A | | 9/1984 | Smith |
| 4,578,793 A | * | 3/1986 | Kane et al. .................... 372/94 |
| 5,022,033 A | * | 6/1991 | Hackell ........................ 372/25 |
| 5,276,701 A | | 1/1994 | Shirasaki |
| 5,751,425 A | | 5/1998 | Tazartes et al. |
| 2006/0256828 A1 | | 11/2006 | Schwartz et al. |
| 2006/0285118 A1 | | 12/2006 | Feugnet et al. |

FOREIGN PATENT DOCUMENTS

| | | |
|---|---|---|
| FR | 03/03645 | 3/2003 |

OTHER PUBLICATIONS

N. Kravstov and E. Lariotsev, "Self-Modulation Oscillations and Relaxations Processes in Solid-State Ring Lasers", Quantum Electronics 24 (10), 841-856, 1994.

\* cited by examiner

FRONT VIEW

SIDE VIEW

STABILIZED SOLID-STATE LASER GYRO AND ANISOTROPIC LASING MEDIUM

CROSS REFERENCE TO RELATED APPLICATIONS

The present Application is based on International Application No. PCT/EP2004/053062, filed on Nov. 23, 2004, which in turn corresponds to FR 03/14598 filed on Dec. 12, 2003, and priority is hereby claimed under 35 USC §119 based on these applications. Each of these applications are hereby incorporated by reference in their entirety into the present application.

BACKGROUND OF THE INVENTION

1. Field of the Invention

The field of the invention is that of solid-state laser gyros used as inertial control unit. This type of equipment is used especially for aeronautical applications.

The laser gyro, developed some thirty years ago, is widely used on a commercial scale at the present time. Its principle of operation is based on the Sagnac effect, which induces a frequency difference $\Delta \nu$ between the two optical transmission modes that propagate in opposite directions, called counterpropagating modes, of a bidirectional laser ring cavity undergoing a rotational motion. Conventionally, the frequency difference $\Delta \nu$ is equal to:

$$\Delta \nu = 4A\Omega/\lambda L$$

where: L and A are the length and the area of the cavity, respectively; $\lambda$ is the laser emission wavelength excluding the Sagnac effect; and $\Omega$ is the rotation speed of the assembly. The value of $\Delta \nu$ measured by spectral analysis of the beat of the two emitted beams is used to determine the value of $\Omega$ very accurately.

2. Description of the Prior Art

It may also be demonstrated that the laser gyro operates correctly only above a certain rotation speed needed to reduce the influence of intermodal coupling. The rotation speed range lying below this limit is conventionally called the blind zone.

The condition for observing the beat, and therefore for the operation of the laser gyro, is the stability of the intensities emitted in the two directions. This is not a priori an easy thing to achieve because of the intermodal competition phenomenon, which means that one of the two counterpropagating modes may have a tendency to monopolize the available gain, to the detriment of the other mode.

This problem is solved in standard laser gyros by the use of a gaseous amplifying medium, generally a helium/neon mixture operating at room temperature. The gain curve of the gas mixture exhibits Doppler broadening due to the thermal agitation of the atoms. The only atoms capable of delivering gain to a given frequency mode are thus those whose velocity induces a Doppler shift in the apparent frequency, which brings the atom to resonance with the mode in question. Forcing the laser emission to take place other than at the center of the gain curve by piezoelectric adjustment of the optical path length ensures that the atoms at resonance with the cavity have a non-zero velocity. Thus, the atoms that can contribute to the gain in one of the two directions have velocities opposite those of the atoms that can contribute to the gain in the opposite direction. The system therefore behaves just as if there were two independent amplifying media, one for each direction. Since intermodal competition has thus disappeared, stable and balanced bidirectional emission occurs. In practice, to alleviate other problems, a mixture consisting of two different neon isotopes is used.

However, the gaseous nature of the amplifying medium is a source of technical complications when producing the laser gyro especially because of the high gas purity required and of premature wear during its use, which wear is in particular due to gas leakage and to deterioration of the electrodes by the high voltages used to establish the population inversion.

At the present time, it is possible to produce a solid-state laser gyro operating in the visible or the near infrared using, for example, an amplifying medium based on neodymium-doped YAG (yttrium aluminum garnet) crystals instead of the helium/neon gas mixture, the optical pumping then being provided by diode lasers operating in the near infrared. It is also possible to use, as amplifying medium, a semiconductor material, a crystalline matrix or a glass doped with ions belonging to the class of rare earths (erbium, ytterbium, etc.). Thus, all the problems inherent with the gaseous state of the amplifying medium are de facto eliminated. However, such a construction is made very difficult to achieve due to the homogeneous character of the broadening of the gain curve of the solid-state media, which induces very strong intermodal competition and because of the existence of a large number of different operating regimes, among which the non-frequency-locked intensity-balanced bidirectional regime, called the "beat regime" is one very unstable particular case (N. Kravtsov and E. Lariotsev, *Self-modulation oscillations and relaxations processes in solid-state ring lasers*, Quantum Electronics 24 (10), 841-856 (1994)). This major physical obstacle has greatly limited hitherto the development of solid-state laser gyros.

To alleviate this drawback, one technical solution consists in attenuating the effects of the competition between counterpropagating modes in a solid-state ring laser by introducing optical losses into the cavity that depend on the direction of propagation of the optical mode and on its intensity. The principle is to modulate these losses by a feedback device according to the difference in intensity between the two transmitted modes in order to favor the weaker mode to the detriment of the other, so as constantly to slave the intensity of the two counterpropagating modes either to a common value or to a constant difference. Technically, the production of the feedback device may be based on the combination of three optical devices that act on the polarization state of the optical modes. These three devices are a linear polarizer, a reciprocal rotator or a waveplate, and a nonreciprocal rotator (French patent application 03/03645).

SUMMARY OF THE INVENTION

The object of the invention is to propose a feedback device for a solid-state laser gyro comprising an intracavity optical assembly, making it possible to regulate the intensity of the counterpropagating optical modes, based no longer on optical losses dependent on the direction of propagation but based on an optical gain that depends on the propagation direction of the optical mode on its intensity. The feedback device therefore modulates the optical gain according to the difference in intensity between the two transmitted modes in order to favor the weaker mode to the detriment of the other, so as constantly to slave the intensity of the two counterpropagating modes to a common value or to a constant difference.

More precisely, the first subject of the invention is a laser gyro comprising at least one optical ring cavity, a solid-state amplifying medium and a feedback system, it being possible for two optical modes called counterpropagating modes to propagate in opposite directions from each other inside said optical cavity, the feedback system being intended to slave the intensity of the two counterpropagating modes, characterized in that the amplifying medium is anisotropic and in that the feedback system includes, inside the cavity, at least an optical assembly an optical element that acts on the polarization state of the counterpropagating modes and an optical rotor exhibiting a nonreciprocal effect that also acts on the polarization state of the counterpropagating modes, at least one of the effects of said optical element or of said optical rotor being adjustable.

The optical element is either a reciprocal optical rotator or a waveplate. As regards the feedback system, two broad technical choices can then be made:

either the effect of the reciprocal rotation or of the waveplate is fixed, and in this case the effect of the nonreciprocal rotation must be able to be adjusted so that the feedback device can operate;

or the effect of the nonreciprocal rotation is fixed, and in this case the effect of the nonreciprocal rotation or of the waveplate must be able to be adjusted so that the feedback device can operate.

The second subject of the invention is a laser gyro comprising at least one optical ring cavity, a solid-state amplifying medium and a feedback system, it being possible for two optical modes called counterpropagating modes to propagate in opposite directions one with respect to the other inside said optical cavity, the feedback system being intended to slave the intensity of the two counterpropagating modes, characterized in that the amplifying medium is anisotropic, in that the cavity is nonplanar, that is to say the two counterpropagating modes do not propagate in a single plane, and in that the feedback system includes, inside the cavity, at least a rotator exhibiting an adjustable nonreciprocal effect.

BRIEF DESCRIPTION OF THE DRAWINGS

The invention will be more clearly understood and other advantages will become apparent on reading the following description, given by way of nonlimiting example and from the appended figures in which.

MORE DETAILED DESCRIPTION

Figure 1:
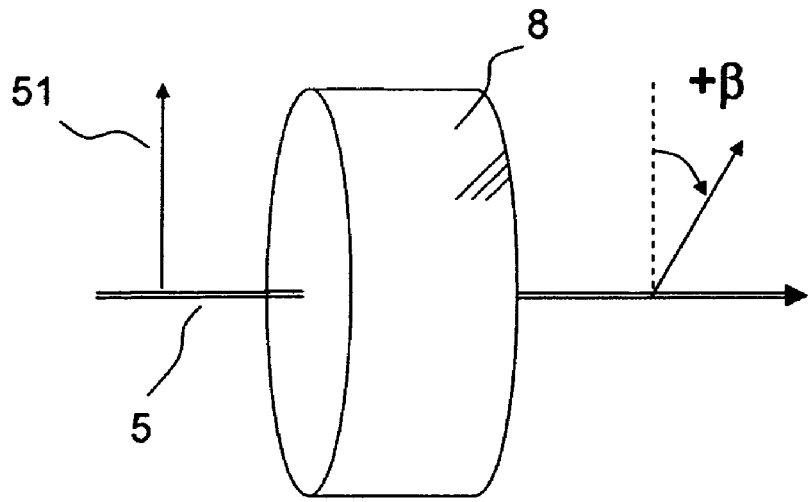
FIG. 1 shows the principle of the nonreciprocal Faraday effect.
Figure 1:
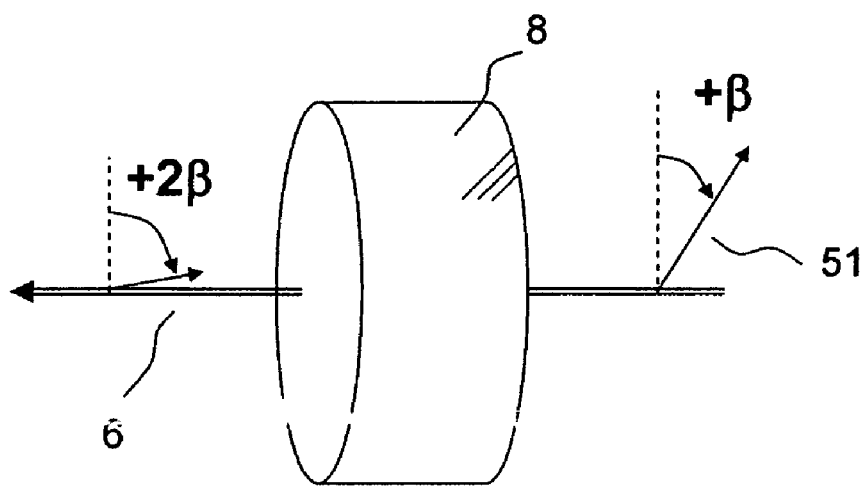
Figure 1:
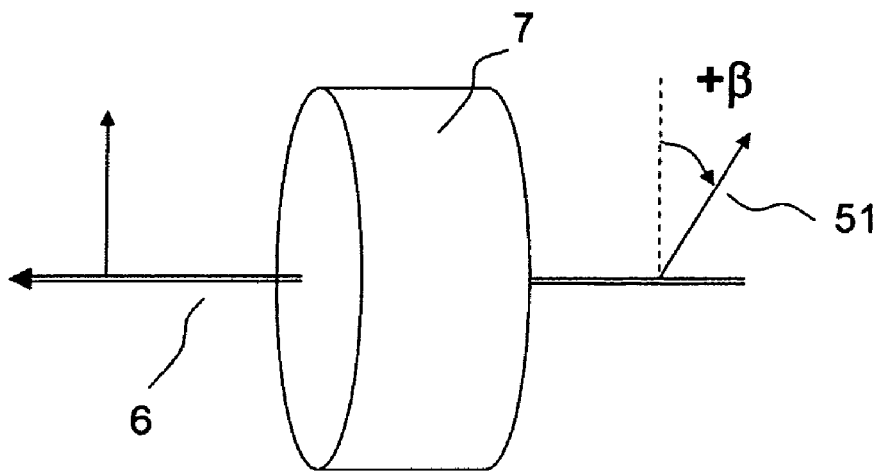

An optical rotation of the polarization of a wave is said to be nonreciprocal when the rotation effects of the polarization combine after a round trip of said wave in an optical component exhibiting this effect. The optical component is called an optical rotator exhibiting a nonreciprocal effect. For example, materials exhibiting the Faraday effect are materials which, when they are subjected to a magnetic field, rotate the plane of polarization of beams passing through them. This effect is not reciprocal. Thus, the same beam traveling in the opposite direction will undergo a rotation in its plane of polarization in the same sense. This principle is illustrated in FIG. 1. The polarization direction 51 of the linearly polarized beam 5 rotates through an angle $\beta$ when it passes through the component 8 exhibiting the Faraday effect in the forward sense (upper diagram in FIG. 1a). If an identical beam 6 propagating in the opposite sense, the direction of polarization of which is initially rotated through $\beta$, is reinjected into the component exhibiting the Faraday effect, its polarization direction 51 again rotates through the angle $\beta$ on passing through the component, the total angle of rotation then being $2\beta$ after a round trip (central diagram in FIG. 1). In a conventional rotator 7 exhibiting a reciprocal effect, the polarization direction 51 would be rotated through $-\beta$, so as to resume its initial position (lower diagram in FIG. 1).

Figure 2A:
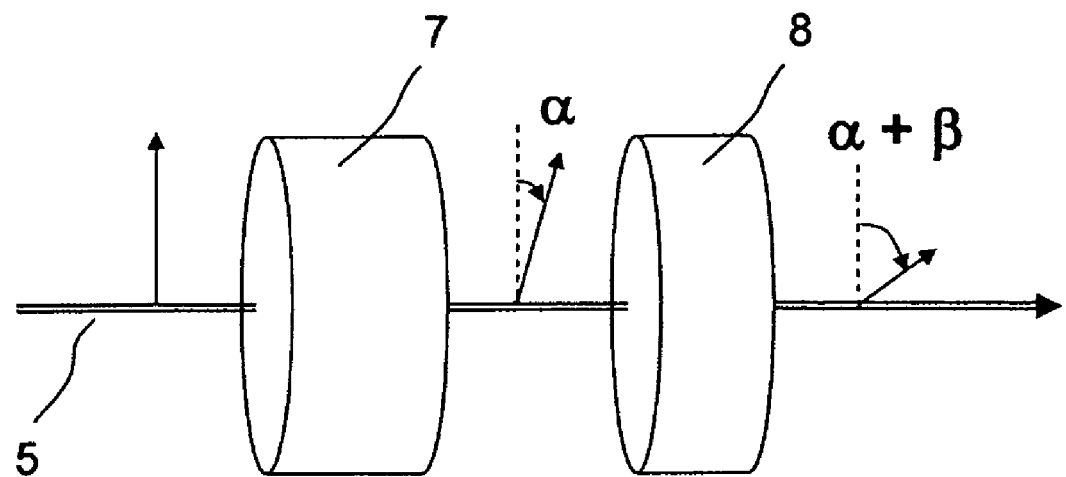
FIGS. 2a and 2b show the general principle of the feedback device in the first embodiment according to the invention.
Figure 2B:
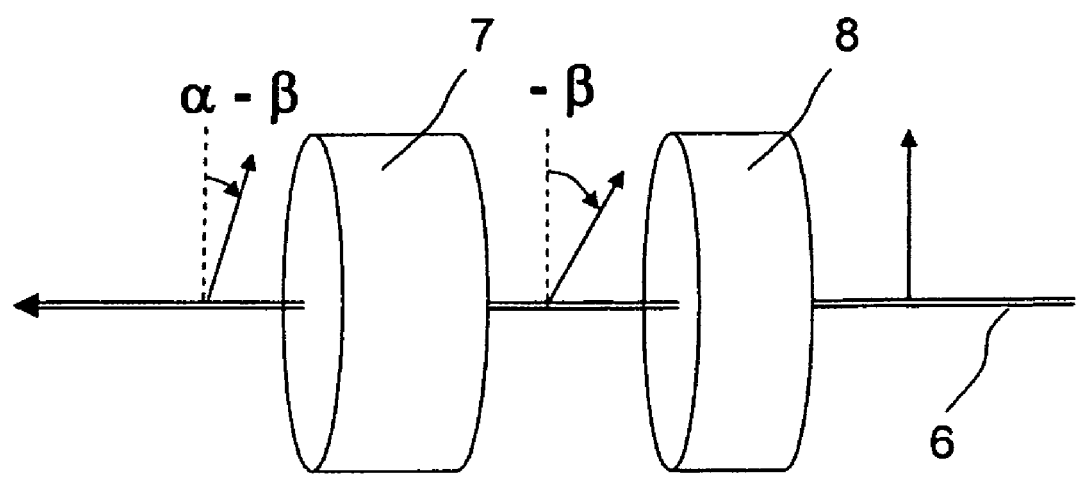

The principle of combining a reciprocal rotation with a nonreciprocal rotation is illustrated in the example shown in FIGS. 2a and 2b in the case of linearly polarized incident beams 5 and 6. The polarization direction of the optical beams has been indicated by an arrow. The first element 7 having a reciprocal effect rotates the polarization of the light through an angle $\alpha$ in the forward direction and the second element 8 rotates the polarization through an angle $\beta$, also in the forward direction. The element 7 may especially be a natural optical rotator such as a quartz plate. Said element 7 may also be a waveplate, such as for example a halfwave plate, the axis of which is rotated through an angle $\alpha/2$ relative to the direction of the incident wave. The element 8 may be a Faraday rotator as mentioned above. Consider a first optical beam 5 linearly polarized vertically and passing in succession through the first and second elements as illustrated in FIG. 2a, after having passed through the first element, its polarization direction has rotated through an angle $\alpha$ and after having passed through the second element its polarization direction has rotated through an angle $\theta_{forward}$ equal to $\alpha+\beta$. Consider a second optical beam 6 linearly polarized and passing in succession in the opposite direction relative to the first beam 5 through the second element and then the first element, as illustrated in FIG. 2b, after having passed through the second element, its polarization direction has rotated through an angle $-\beta$ and after having passed through the first element its polarization direction has rotated through an angle $\theta_{reverse}$ equal to $\alpha-\beta$.

An anisotropic lasing medium exhibits the particular feature of having stimulated emission polarized in a preferential direction. Thus, in order for an optical beam passing through said medium to be amplified with a maximum gain, it must be polarized in this preferential direction. In a direction perpendicular to this preferential direction, the lasing medium may exhibit a gain, but in general the value of this gain is very close to unity and does not make it possible to obtain a lasing effect. As a nonlimiting example, mention may be made, as anisotropic lasing medium of this type, crystalline media comprising a $YVO_4$ matrix or a YLF matrix that includes $Nd^{3+}$ neodyme ions.

Figure 3:
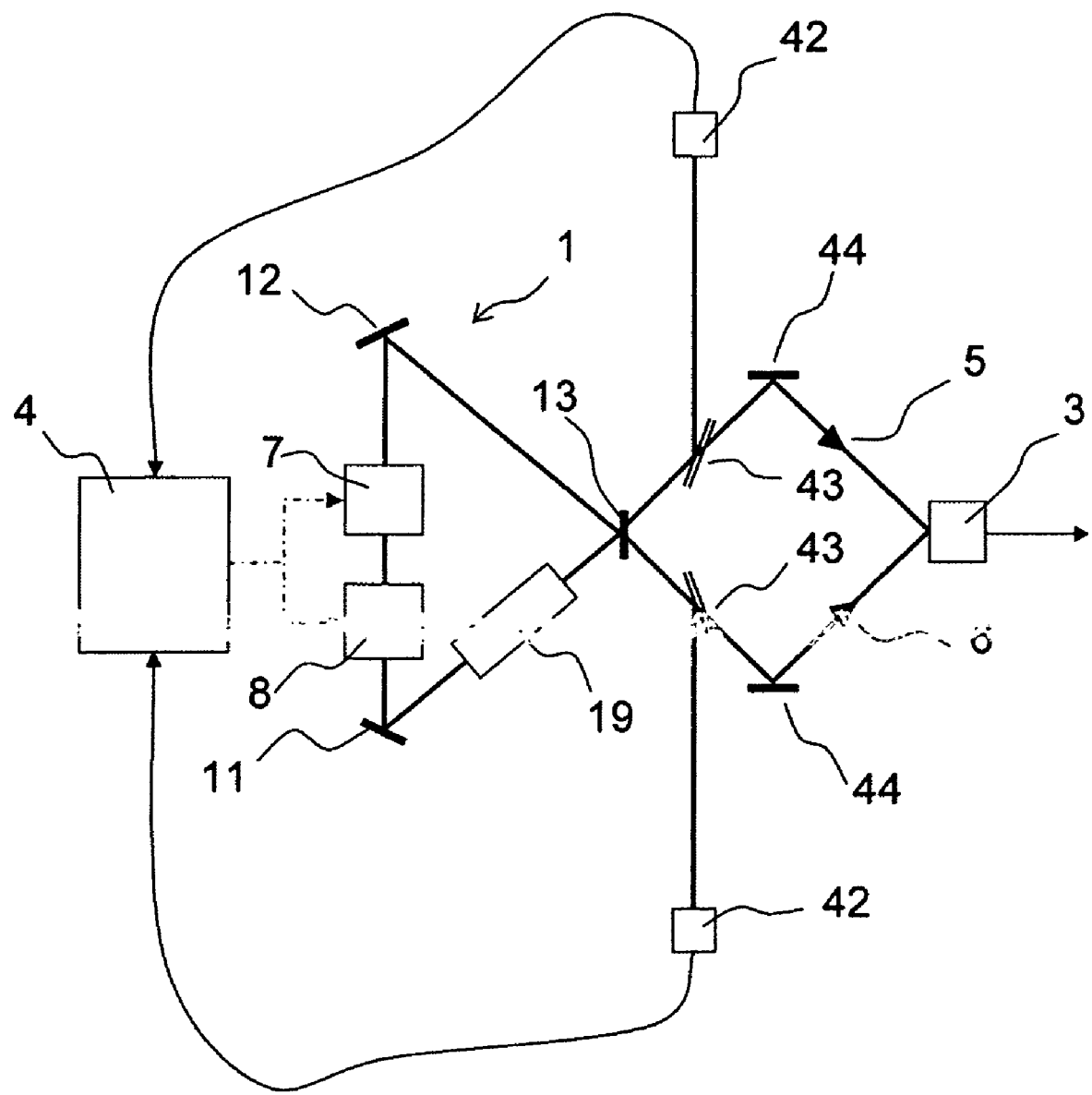
FIG. 3 shows the general diagram of the feedback device in the first embodiment according to the invention.

FIG. 3 describes the general principle of the laser gyro in the first embodiment according to the invention. It includes a laser cavity having 3 mirrors 11, 12 and 13, said cavity comprising a reciprocal rotator or a waveplate 7, a nonreciprocal rotor 8, these elements being similar to those of FIGS. 2a and 2b, and an anisotropic lasing medium 19. For example, the first element 7 exhibiting a reciprocal effect-rotates the polarization of the light through an angle α in the forward direction and the second element 8 rotates the polarization through an angle β, again in the forward direction. An optical mode linearly polarized in the same polarization direction as that of the stimulated emission in the lasing medium is amplified with a maximum gain and can thus oscillate efficiently. When such an intra-cavity mode makes a complete revolution of the cavity, undergoing firstly the reciprocal effect and then the nonreciprocal effect, its plane of polarization rotates through an angle $\theta_{forward}$ equal to α+β in a direction called the forward direction and through an angle $\theta_{reverse}$ equal to α−β in the opposite direction. In the forward direction, only the projection of the polarization parallel to the polarization direction of the stimulated emission is amplified. This projection is proportional to the angle $\theta_{forward}$. When an intra-cavity optical mode makes a complete round trip in the reverse direction, only the projection of the polarization parallel to the polarization direction of the stimulated emission is again amplified. This projection is proportional to the angle $\theta_{reverse}$.

Consequently, the gain of the amplification in the lasing medium is different depending on the direction of propagation and depends directly on the magnitude of the effects undergone by the polarization of the two modes. It is thus possible to vary the intensities of the counterpropagating modes differently, by varying at least one of the two values of the effects undergone by the polarizations of the two modes. To fulfill this feedback function, a portion of the beams 5 and 6 is taken off, for example by means of two semireflecting plates 43 and sent to the two photodetectors 42 as indicated in FIG. 3. The signals output by these two photodetectors are representative of the light intensity of the two counterpropagating optical modes 5 and 6. Said signals are sent to the electronic feedback module 4 which controls, according to the intensity of the signals received, the variable-effect device comprising the elements 7 and 8 (dotted arrows in the diagram). This translates to variations in the polarization states of the two counterpropagating modes 5 and 6. These polarization state variations then result in different optical gains in the counterpropagating optical modes 5 and 6 each time that, having made a complete rotation, the modes pass again through the amplifying medium 19. These gains depend on the intensity of the output beams. If one of the beams has a light intensity higher than the other, its intensity will be increased less by the feedback device so as to bring output beams to the same intensity level. Thus the bidirectional regime is intensity-stabilized.

Of course, the device according to the invention may be adapted to any combination of reciprocal rotations, waveplates, polarizers and nonreciprocal rotators that act on the polarization state of the light in such a way that said combination can be converted into a variation in gain by the lasing medium. In an actual cavity, various types of components (cavity mirrors, amplifying medium, etc.) may in addition influence the polarization state of the optical beams and their intensity. In order for the parameters of the counterpropagating beams to be known precisely after they have completed one revolution in the cavity, the formalism of Jones matrices is used. This consists in representing the influence of a component on the polarization state by a 2×2 matrix referenced in a plane perpendicular to the propagation direction of the beams. In general, the axes of the chosen reference frame correspond to the principal axes of an intra-cavity polarizer. This simplifies the mathematical representation. To determine the resulting influence of all of the intra-cavity components, all that is then required is to calculate the product of the various matrices representative of these components. Since this product is not commutative and since the expression of certain Jones matrices depend on the propagation direction, the influence may be different depending on the propagation direction of the beams. It has been demonstrated that at least one nonreciprocal rotator and one reciprocal rotator or a waveplate or a polarizer are necessary to obtain this effect.

There are various methods for producing fixed reciprocal rotors.

The optical element may be a linear polarizer, the polarization direction of which is not parallel to the direction of maximum gain of the amplifying medium.

It is also possible to obtain a fixed reciprocal rotation by using a natural optical rotator, such as a birefringent optical plate obtained for example from a material that is naturally birefringent, such as quartz.

It is also possible to act on the polarization states using a waveplate. Of course, this waveplate may be made integral with one of the mirrors of the cavity so as to simplify the construction of the device.

Figure 4A:
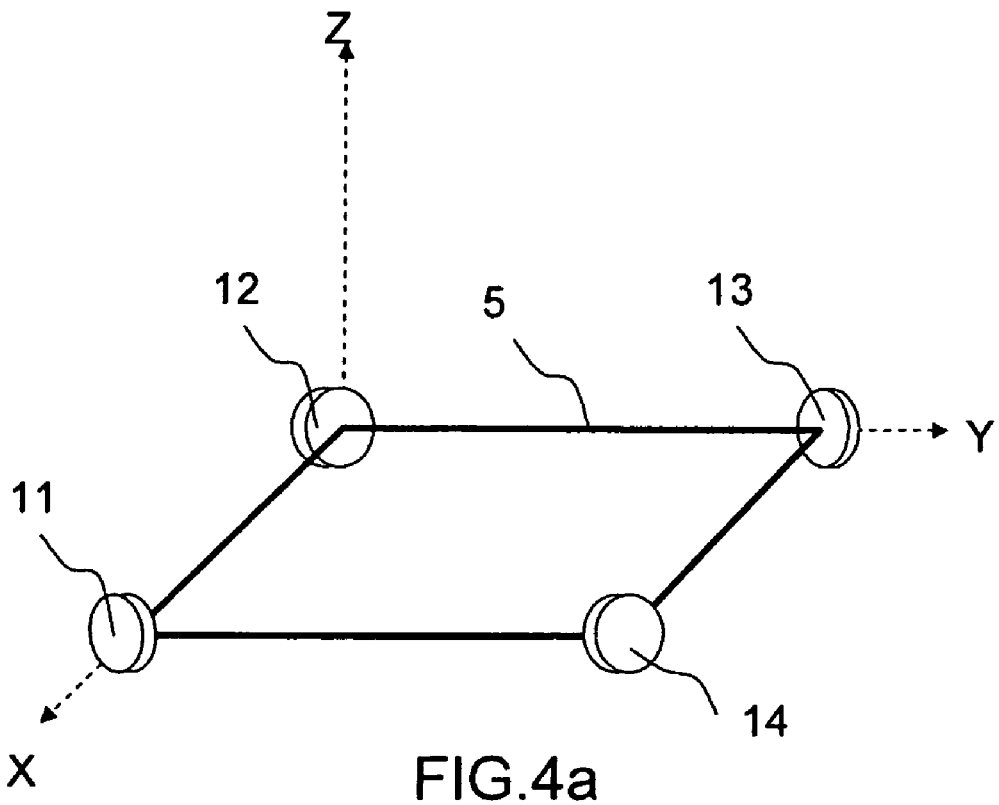
FIGS. 4a and 4b show the general principle of the reciprocal rotation induced by a noncoplanar cavity.
Figure 4B:
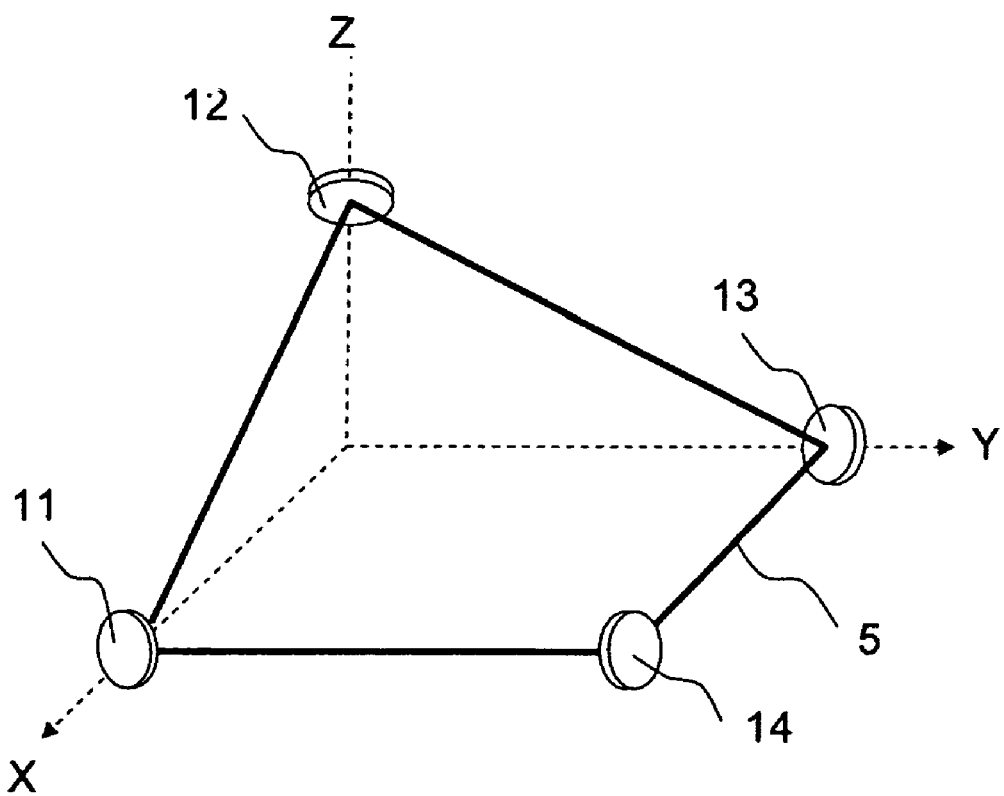

In a second embodiment of the invention, in particular, it is possible to use a nonplanar cavity as described in FIGS. 4a and 4b instead of an optical element acting on the polarization state of the counterpropagating modes. Consider a cavity 1 having at least four mirrors 11, 12, 13 and 14. It is possible to place them, as indicated in FIG. 4a, in such a way that the counterpropagating beams propagate in one plane (the (X,Y) plane in FIG. 4a). In this case, if these beams are linearly polarized, the polarization direction is maintained. It is also possible to place them in such a way that the counterpropagating beams no longer propagate in one plane, as indicated for example in FIG. 4b, in which the mirror 12 has been displaced along the Z axis. In this case, it has been demonstrated that the polarization direction of the counterpropagating beams has rotated through an angle that depends on the geometry of the cavity when the beam has made one complete revolution in the cavity (A. C. Nilsson, E. K. Gustafson and R. L. Byer, *Eigenpolarization Theory of Monolithic Nonplanar Ring Oscillators*, IEEE Journal of Quantum Electronics 25 (4), 767-790 (1989)). This property may be used to form the cavities according to the invention. In this case, it remains to place a variable nonreciprocal rotator inside the nonplanar cavity.

To produce the optical function equivalent to that of the variable waveplate, one possible solution consists in using a device exhibiting controllable birefringence. To induce controllable birefringence, it is possible to use:

lead, lanthanum, zirconium and titanium ceramics ($Pb_{1-x}La_xZr_{1-y}Ti_yO_3$), the orientation of the neutral axes and the birefringence of which may both be controlled in a region by surrounding it with electrodes and applying an electric field of a few hundred volts. These ceramics have thicknesses of less than one millimeter, are transmissive in the near infrared, have control voltages of a few hundred volts, and a response time of the order of one microsecond, compatible with the necessary bandwidth determined to be a few tens of kilohertz;

liquid-crystal valves with a thickness of about one millimeter (the active zone of which has a thickness of about 20 microns) having control voltages of a few tens of volts; or Pockels cells, the phase shift of which is modified by changing the applied voltage (typically 1 kilovolt in order for the phase shift obtained to be equal to π/2). These cells, made of KDP or lithium niobate for example, are identical to those used for triggering a laser. They have thicknesses of one to two centimeters and zero insertion losses.

To produce a nonreciprocal rotation, it is general practice to use magnetooptic devices, for example exhibiting the Faraday effect, which, in order to operate, require the generation of a magnetic field. These Faraday effect elements may especially be produced directly on the cavity mirrors by means of layers of magnetooptic material. If it is desired to obtain a fixed nonreciprocal rotation, all that is required is to generate a permanent magnetic field by means of magnet-based magnetic circuits. If it is desired to obtain a variable nonreciprocal effect, all that is then required is to create a variable magnetic field, for example by means of an induction coil surrounding the material exhibiting the Faraday effect and controlled by an adjustable electric current.

When the medium so allows, it is advantageous to use the same element both as amplifying medium and as the Faraday effect medium.

Figure 5:
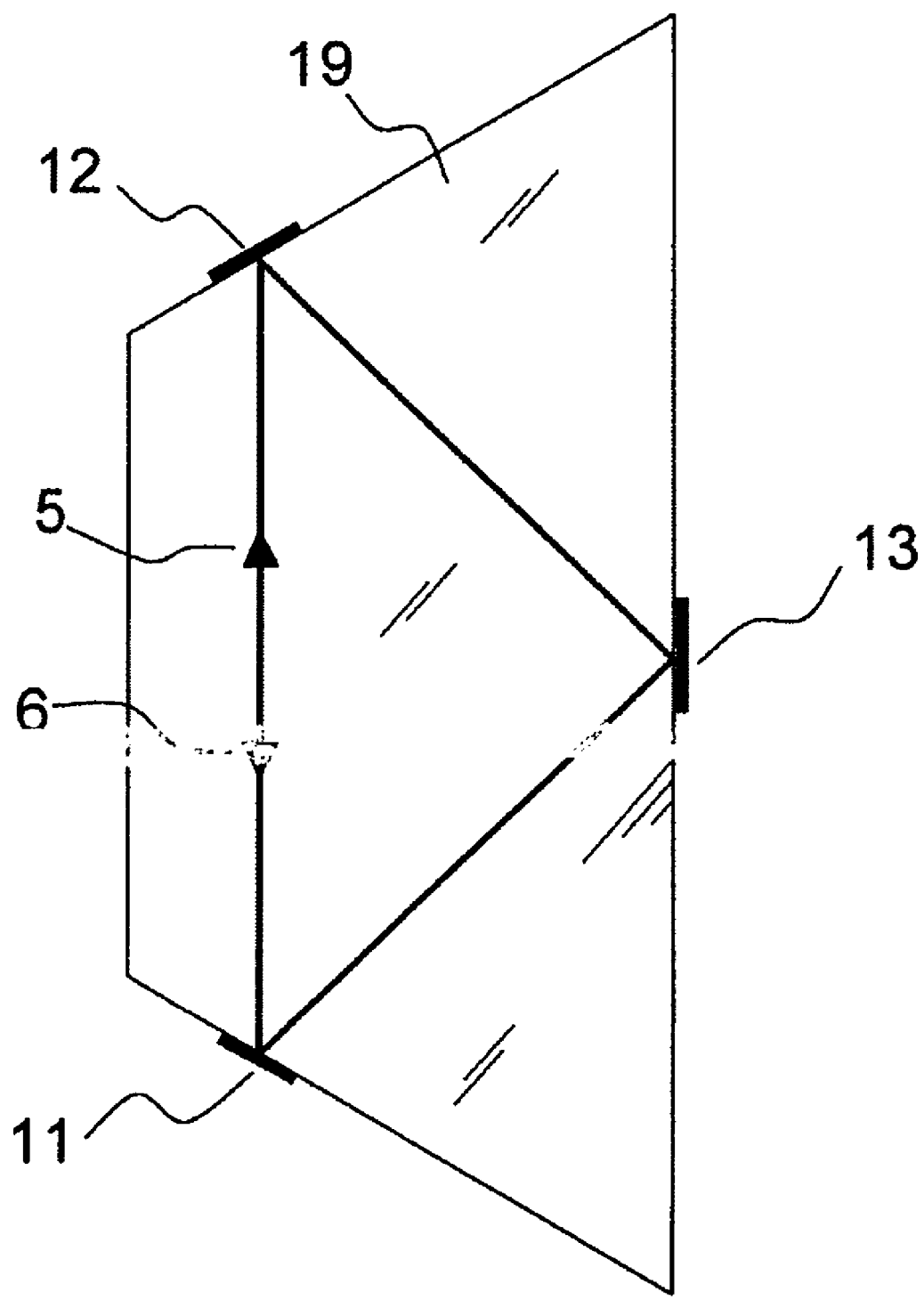
FIG. 5 shows the general view of a monolithic cavity.
Figure 6:
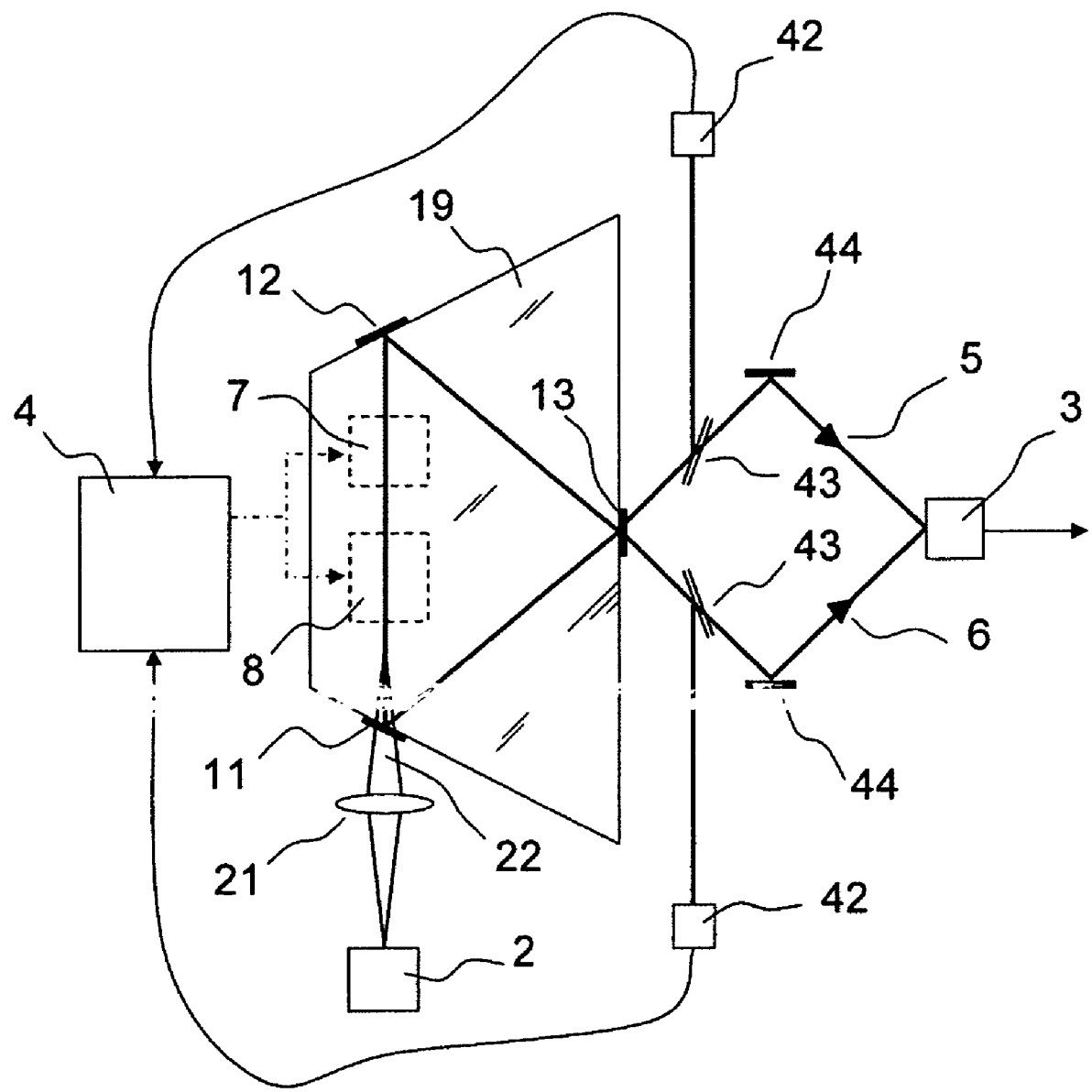
FIG. 6 shows the general view of a laser gyro that includes a monolithic cavity.

Advantageously, a solid-state laser according to the invention is produced from a monolithic cavity as indicated in FIGS. 5 and 6. This configuration has several advantages.

The mirrors 11, 12 and 13 are then deposited directly on the faces of the monolithic cavity. The cavity may be produced directly in the material serving as amplifying medium. FIG. 6 shows a diagram of one embodiment of a laser gyro according to the invention using a cavity of this type. The material 19 of the cavity also serves as amplifying medium. In this case, the optical pumping is performed by means of a diode laser 2, the beam 22 of which is focused inside the amplifying medium by means of a lens 21. The elements 7 and 8 are shown by the dotted lines in this figure.

Figure 7:
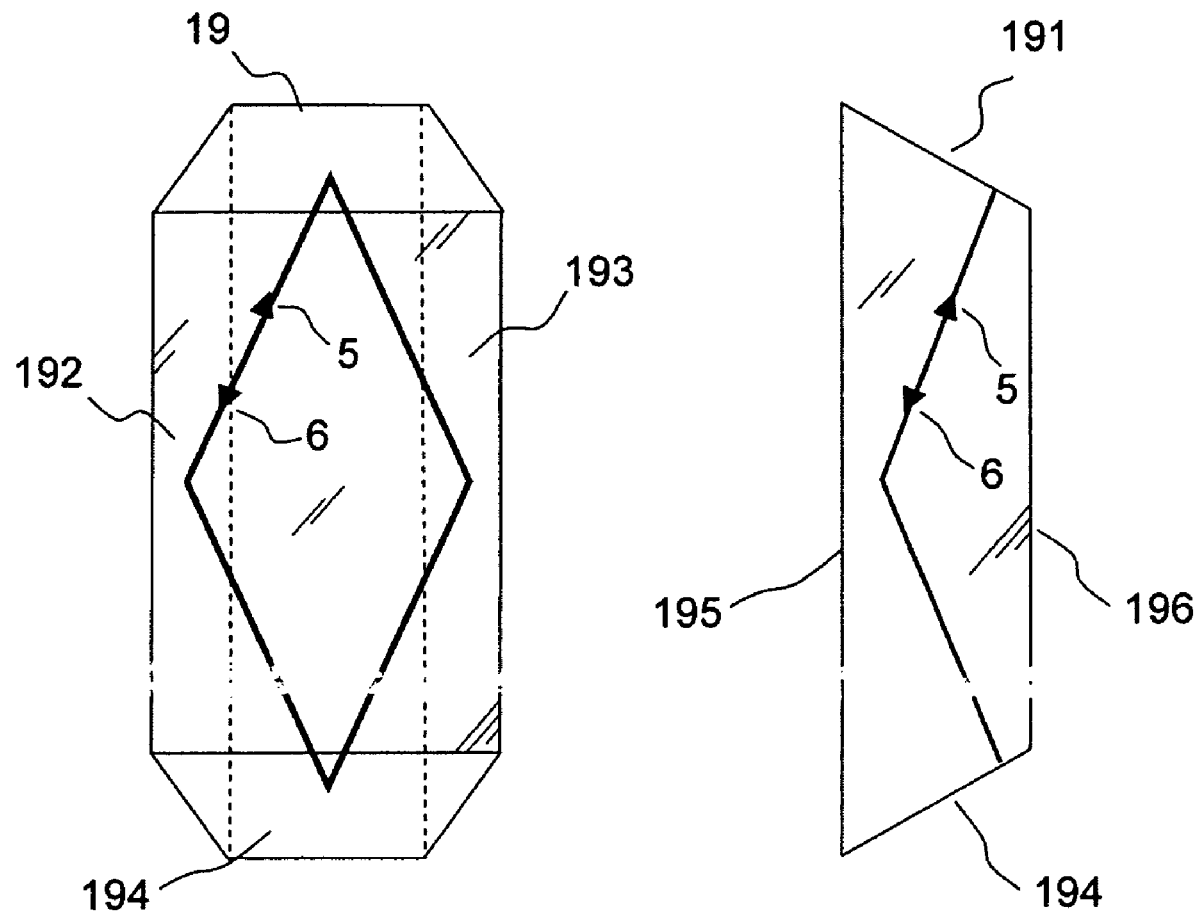
FIG. 7 shows the basic diagram of a monolithic nonplanar cavity.

The monolithic cavity may also be nonplanar. The reciprocal rotation is thus obtained directly by the very shape of the cavity. In the example of FIG. 7, the cavity is a thick plate having two plane parallel faces 195 and 196 between them and four inclined lateral faces 191, 192, 193 and 194. The general shape of the plate is that of a truncated wedge. The inclination of the lateral faces is chosen in such a way that light beams traveling through the cavity follow a broken rhombus as indicated in FIG. 7.

Figure 8A:
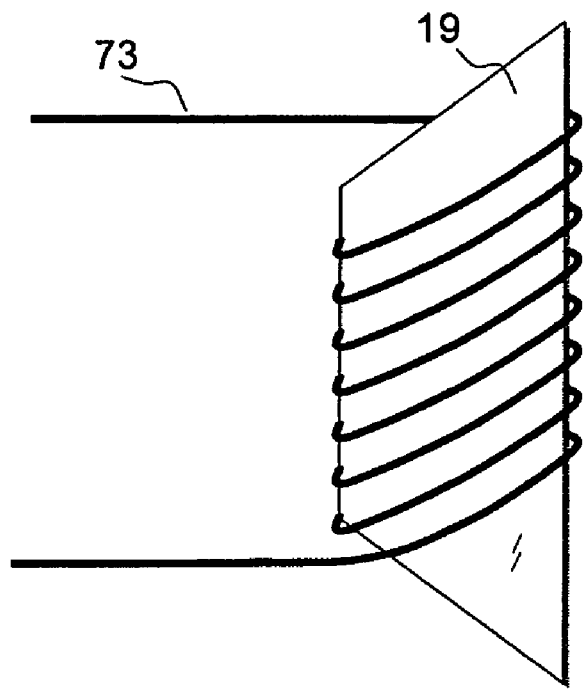
FIGS. 8a and 8b show basic diagrams of the creation of a variable magnetic field in a monolithic cavity exhibiting the Faraday effect.
Figure 8B:
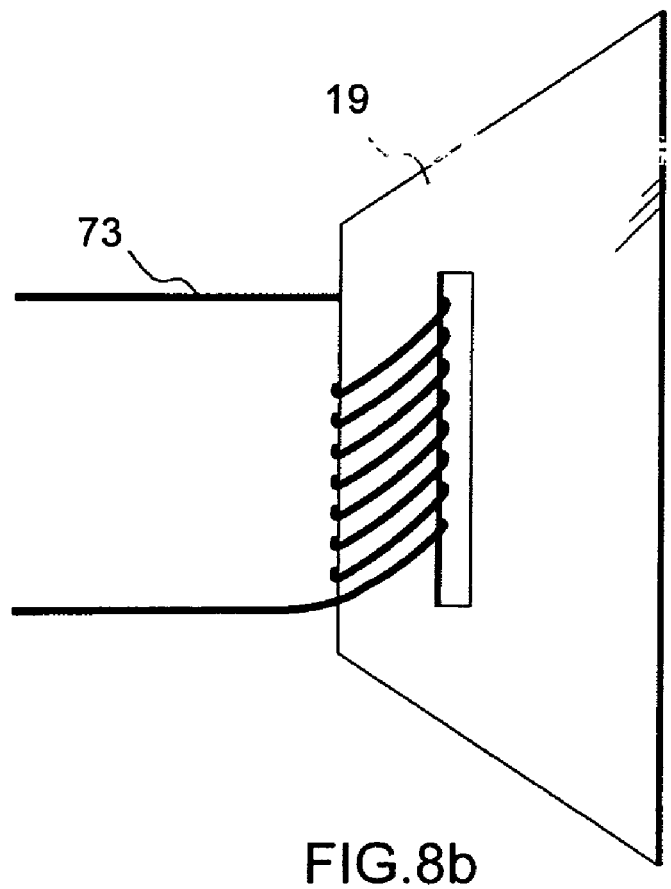

One of the other advantages of the monolithic cavity is that the amplifying medium 19 may be used as a medium exhibiting the Faraday effect. In this case, a variable magnetic field is obtained by winding an induction coil 73 around the monolithic cavity, as illustrated in FIG. 8a. To improve the effectiveness of the magnetic field, it is also possible to wind one or more induction coils around only a portion of the cavity, as illustrated in FIG. 8b. In this case, the cavity must be pierced in order to allow the electrical wires constituting the conduction coils to pass through it.

Figure 9:
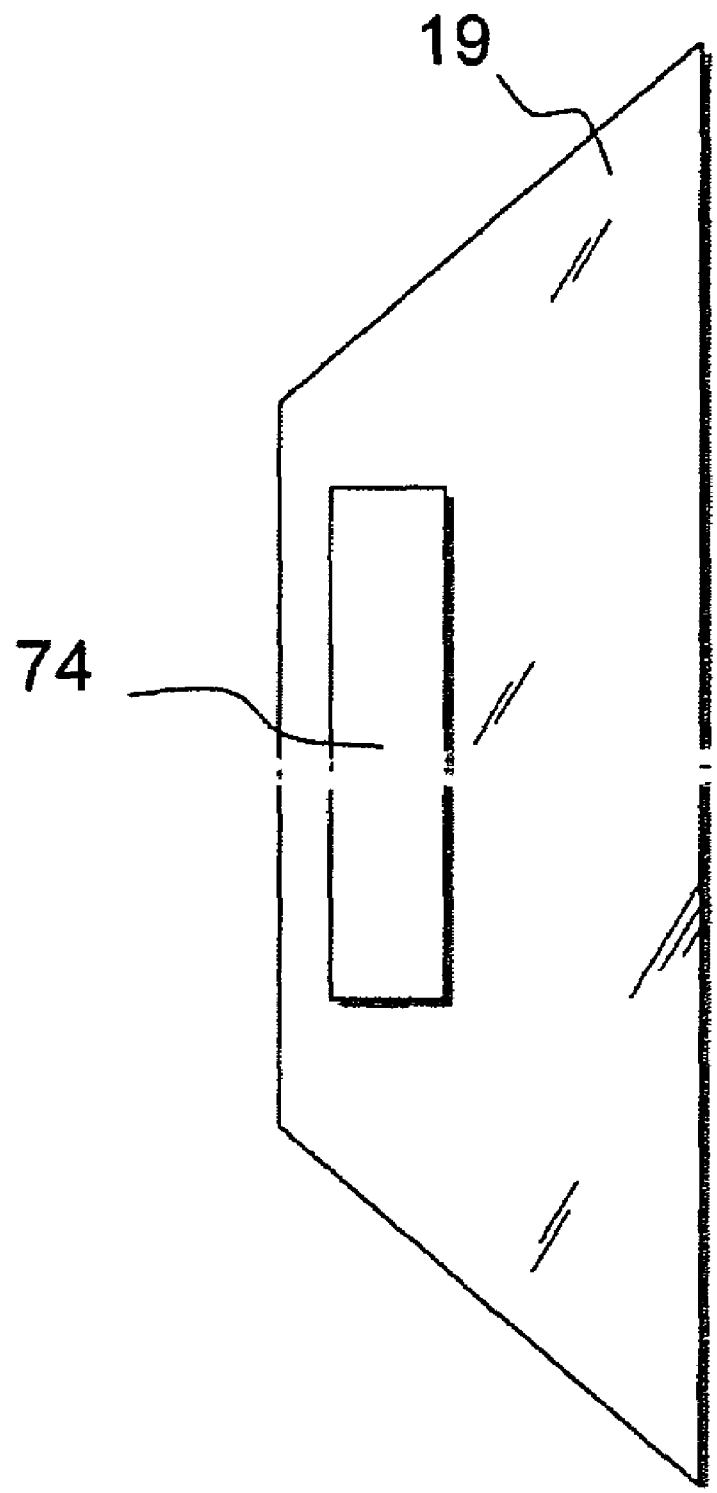
FIG. 9 shows the basic diagram of the creation of a fixed magnetic field in a monolithic cavity exhibiting the Faraday effect.

A fixed magnetic field may be obtained by placing permanent magnets 74 on the monolithic cavity as illustrated in FIG. 9.

The invention claimed is:

1. A laser gyro comprising:
   an optical ring cavity,
   a solid-state amplifying medium and a feedback system,
   two optical modes propagating in opposite directions from each other inside said optical cavity, the feedback system slaving the intensity of the two counterpropagating modes:
   wherein the amplifying medium is anisotropic and wherein the feedback system includes, inside the cavity,
   an optical assembly comprising an optical element that acts on the polarization state of the counterpropagating modes and a rotor exhibiting a nonreciprocal effect that also acts on the polarization state of the counterpropagating modes, at least one of the effects of said optical element or of said rotor exhibiting an adjustable nonreciprocal effect, the feedback system being configured so that, if one of the optical modes has a light intensity higher than the other, its intensity is increased less by the amplifying medium so as to bring output modes to the same intensity level.

2. The laser gyro as claimed in claim 1, wherein when the optical element acts on the polarization state of the counterpropagating modes in a fixed manner, said element is a linear polarizer, the polarization direction of which is not parallel to the direction of maximum gain of the amplifying medium.

3. The laser gyro as claimed in claim 1, wherein when the optical element acts on the polarization state of the counterpropagating modes in a fixed manner, said element is a birerefringent optical plate.

4. The laser gyro as claimed in claim 3, wherein said optical element is a birerefringent optical plate obtained from a naturally birefringent material.

5. The laser gyro as claimed in claim 4, wherein said optical element is made of quartz.

6. The laser gyro as claimed in claim 1, wherein when the optical element acts on the polarization state of the counterpropagating modes in an adjustable manner, said element is an optical plate exhibiting electrically controlled birefringence.

7. The laser gyro as claimed in claim 1, wherein when the rotor exhibiting a nonreciprocal effect acts on the polarization state of the counterpropagating modes in a fixed manner, and comprises a material exhibiting the Faraday effect polarized by a permanent magnet.

8. The laser gyro as claimed in claim 7, wherein the amplifying medium also comprises the material exhibiting the Faraday effect.

9. The laser gyro as claimed in claim 1, wherein the device exhibiting a nonreciprocal effect acts on the polarization state of the counterpropagating modes in an adjustable manner, it comprises a material exhibiting the Faraday effect and polarized by an induction coil controlled by an adjustable electrical current.

10. The laser gyro as claimed in claim 1, wherein the cavity is monolithic.

11. A laser gyro comprising:
    an optical ring cavity,
    a solid-state amplifying medium and
    a feedback system having two optical modes propagating in opposite directions one with respect to the other inside said optical cavity, the feedback system being intended to slave the intensity of the two counterpropagating modes, wherein the amplifying medium is anisotropic, in that the cavity is nonplanar, the counterpropagating modes do not propagate in a single plane, and in that the feedback system includes, inside the cavity, at least a rotor exhibiting an adjustable nonreciprocal effect, and wherein the feedback system is configured so that, if one of the optical modes has a light intensity higher than the other, its intensity is increased less by the amplifying medium so as to bring output modes to the same intensity level.

* * * * *